United States Patent
Sasaki

(10) Patent No.: US 12,022,187 B2
(45) Date of Patent: Jun. 25, 2024

(54) IMAGE CAPTURING APPARATUS INCLUDING PLURALITY OF SOUND INPUT UNITS, CONTROL METHOD, AND RECORDING MEDIUM

(71) Applicant: CANON KABUSHIKI KAISHA, Tokyo (JP)

(72) Inventor: Koichi Sasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 167 days.

(21) Appl. No.: 17/677,537

(22) Filed: Feb. 22, 2022

(65) Prior Publication Data

US 2022/0272253 A1    Aug. 25, 2022

(30) Foreign Application Priority Data

Feb. 25, 2021   (JP) ................. 2021-028812

(51) Int. Cl.
  *H04N 23/66*   (2023.01)
  *G06F 3/16*    (2006.01)
  *H04N 5/60*    (2006.01)

(52) U.S. Cl.
  CPC ............. *H04N 23/66* (2023.01); *G06F 3/167* (2013.01); *H04N 5/607* (2013.01)

(58) Field of Classification Search
  CPC ... H04N 23/66–662; G06F 3/16; G06F 3/162; G06F 3/167

USPC .................................................. 348/231.99
See application file for complete search history.

(56) References Cited

U.S. PATENT DOCUMENTS

| 2017/0019580 A1* | 1/2017 | Boghosian | ............ G11B 27/10 |
| 2020/0296284 A1* | 9/2020 | Aikawa | ................ H04N 23/665 |
| 2020/0344415 A1* | 10/2020 | Milne | ..................... G06F 3/167 |

FOREIGN PATENT DOCUMENTS

| JP | 2003219243 A | 7/2003 | |
| WO | WO-2006107102 A1 * | 10/2006 | ............ H04N 5/772 |
| WO | WO-2008018351 A1 * | 2/2008 | ......... H04N 5/23203 |

* cited by examiner

*Primary Examiner* — Anthony J Daniels
(74) *Attorney, Agent, or Firm* — Canon U.S.A., Inc. IP Division

(57) ABSTRACT

An image capturing apparatus includes a first sound input unit, a second sound input unit different from the first sound input unit, an image capturing unit, and a control unit, wherein the control unit generates moving image data with sounds from moving image data generated by the image capturing unit and sound data generated by the first sound input unit, wherein, in a case where a sound corresponding to a voice instruction to control the image capturing apparatus is detected from sound data input to the second sound input unit, the control unit controls the image capturing apparatus based on the voice instruction, and wherein the second sound input unit includes a wireless communication unit configured to receive sound data from an external apparatus.

9 Claims, 5 Drawing Sheets

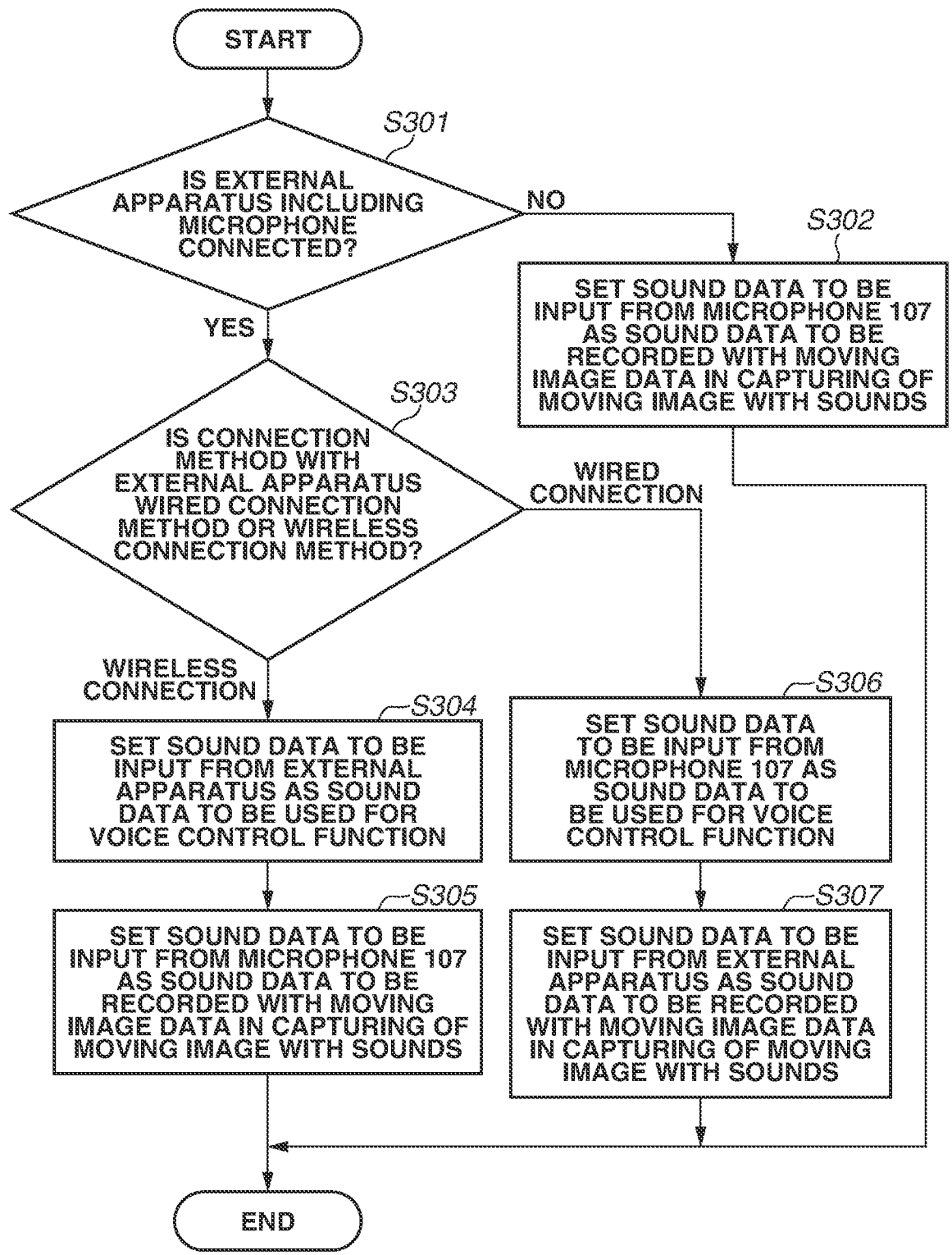

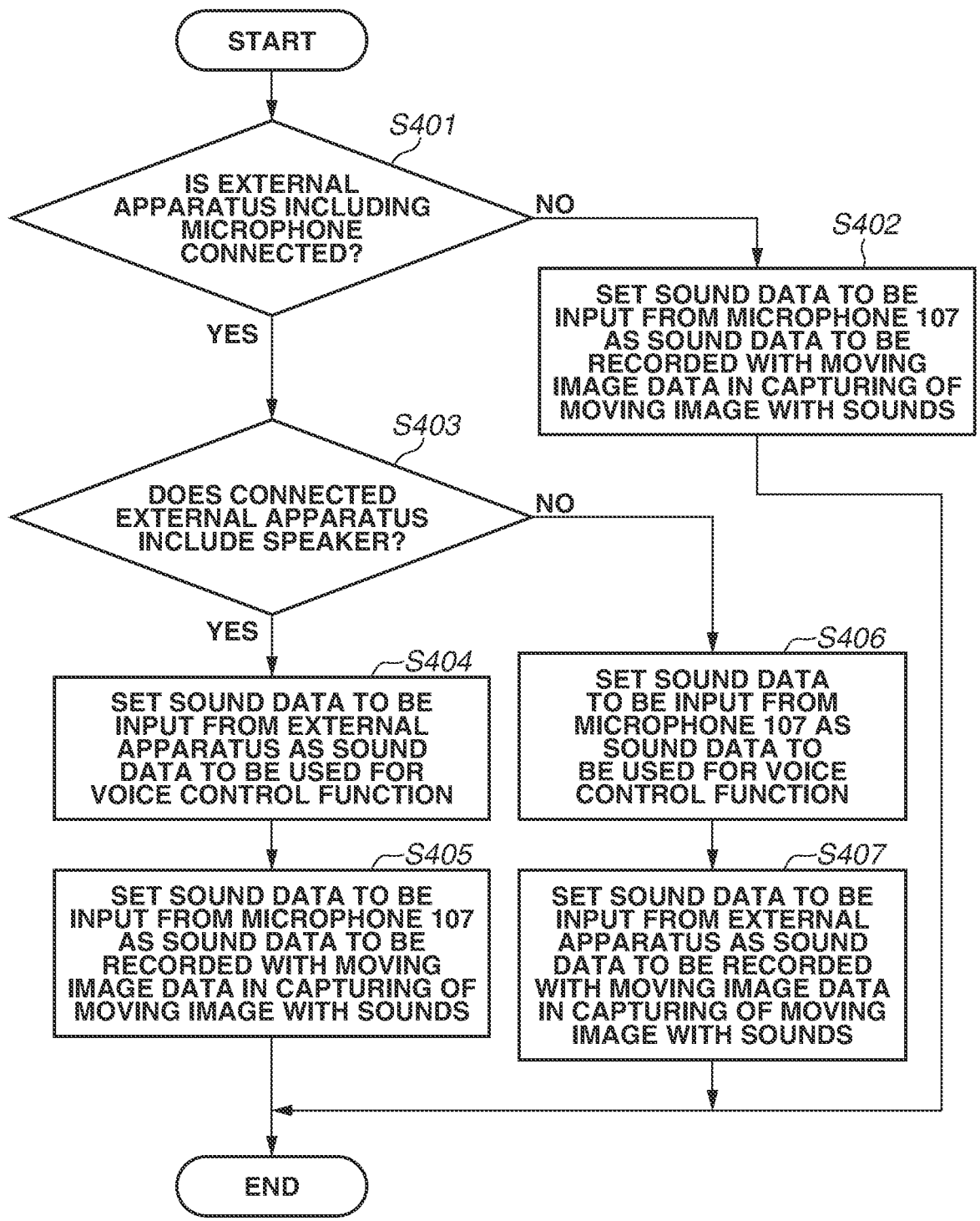

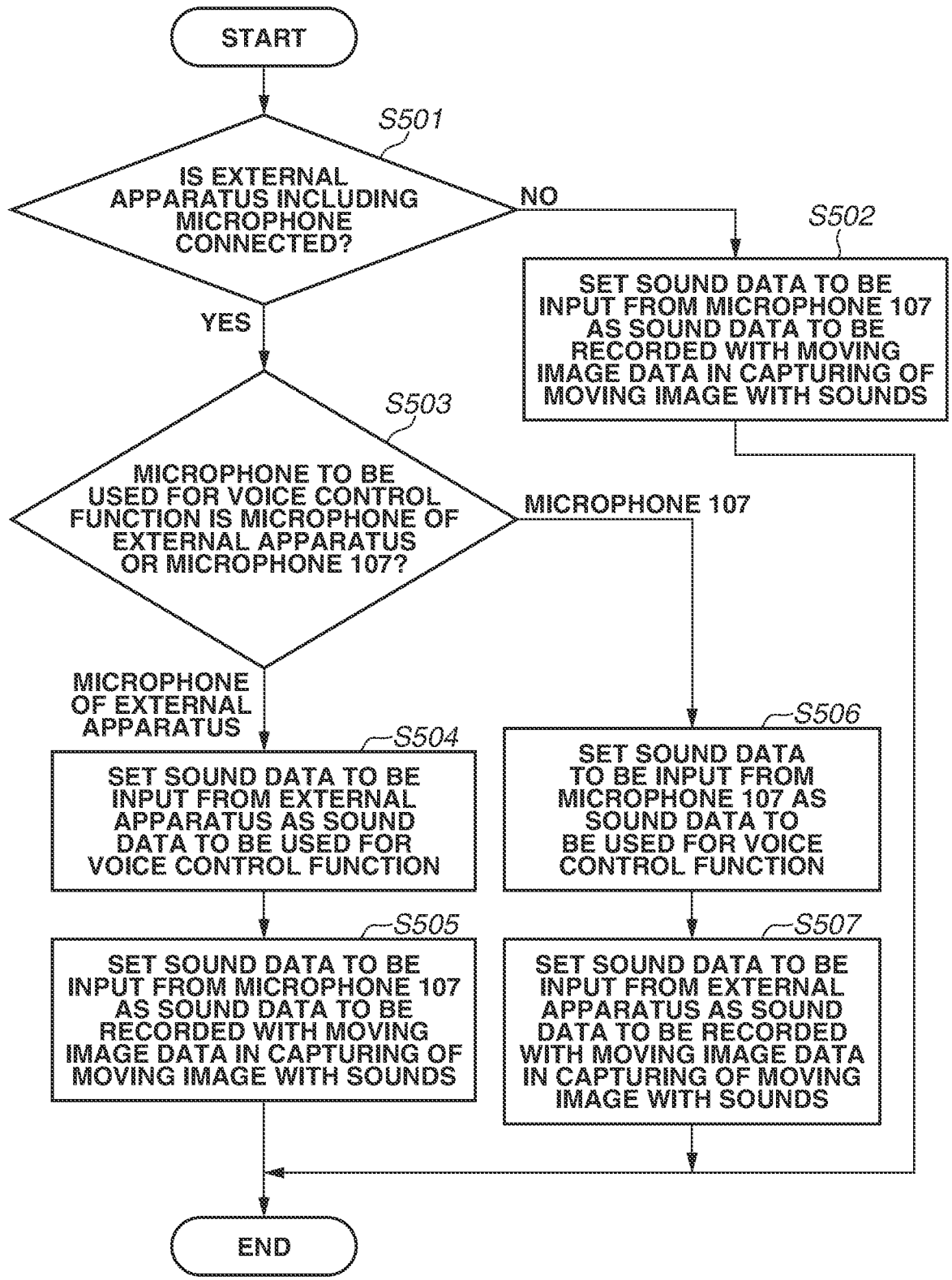

IMAGE CAPTURING APPARATUS INCLUDING PLURALITY OF SOUND INPUT UNITS, CONTROL METHOD, AND RECORDING MEDIUM

BACKGROUND OF THE DISCLOSURE

Field of the Disclosure

The present disclosure relates to an image capturing apparatus that can generate sound data and moving image data.

Description of the Related Art

Some image capturing apparatuses include a first microphone and can be connected to a second microphone. Such an image capturing apparatus can generate moving image data with sounds from moving image data generated by an image capturing unit and sound data generated by the first microphone or the second microphone, and record the generated moving image data with sounds in a recording medium. Japanese Patent Application Laid-Open No. 2003-219243 discusses an image capturing apparatus that includes a first microphone and can be connected to a second microphone.

Some image capturing apparatuses have a voice control function. An image capturing apparatus having the voice control function can perform processing corresponding to a voice instruction issued to the image capturing apparatus from a user.

However, for example, in a case where the user issues a voice instruction to the image capturing apparatus having the voice control function while the image capturing apparatus records moving image data with sounds in a recording medium, a sound of the voice instruction may be recorded with the moving image data in the recording medium.

SUMMARY OF THE DISCLOSURE

According to an aspect of the present disclosure, an image capturing apparatus includes a first sound input unit, a second sound input unit different from the first sound input unit, an image capturing unit, and a control unit, wherein the control unit generates moving image data with sounds from moving image data generated by the image capturing unit and sound data generated by the first sound input unit, wherein, in a case where a sound corresponding to a voice instruction to control the image capturing apparatus is detected from sound data input to the second sound input unit, the control unit controls the image capturing apparatus based on the voice instruction, and wherein the second sound input unit includes a wireless communication unit configured to receive sound data from an external apparatus.

Further features of the present disclosure will become apparent from the following description of exemplary embodiments with reference to the attached drawings.

BRIEF DESCRIPTION OF THE DRAWINGS

FIG. 3 is a flowchart illustrating an example of setting processing according to the first exemplary embodiment.

FIG. 4 is a flowchart illustrating an example of setting processing according to a second exemplary embodiment.

FIG. 5 is a flowchart illustrating an example of setting processing according to a third exemplary embodiment.

DESCRIPTION OF THE EMBODIMENTS

Some exemplary embodiments of the present disclosure are described below with reference to drawings. The present disclosure, however, is not limited to the following exemplary embodiments.

<Configuration of Image Capturing Apparatus 100>

Figure 1:
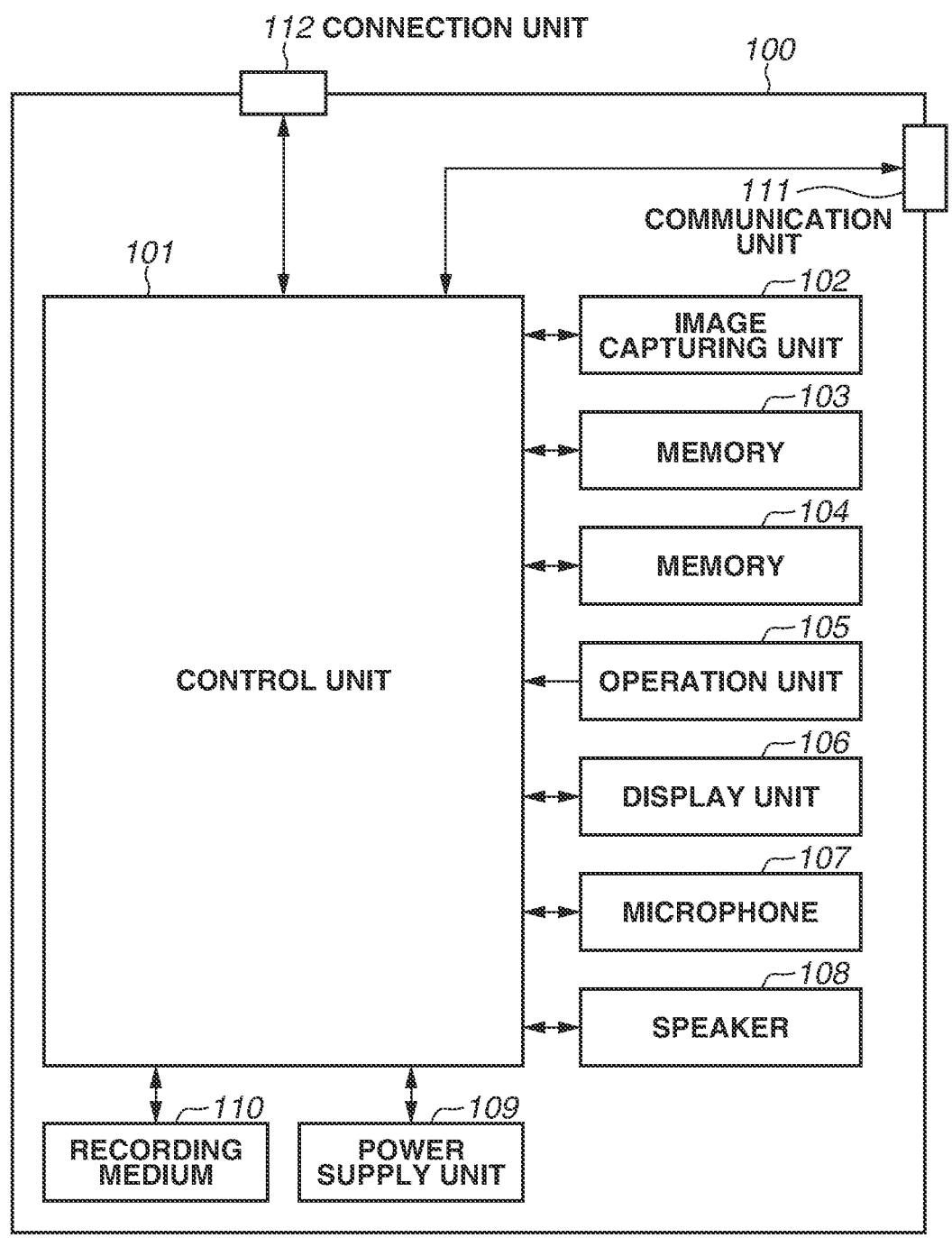
FIG. 1 is a block diagram illustrating a configuration example of an image capturing apparatus according to a first exemplary embodiment.

FIG. 1 is a block diagram illustrating a configuration example of an image capturing apparatus 100 according to a first exemplary embodiment. While, in the present exemplary embodiment and other exemplary embodiments, a description will be provided of a case where the image capturing apparatus 100 is an electronic apparatus operable as a digital camera, the image capturing apparatus 100 is not limited to the digital camera. Alternatively, the image capturing apparatus 100 may be an apparatus operating as any of a smartphone, a personal computer, and a tablet terminal. Examples of units in the image capturing apparatus 100 includes a microphone 107 operating as a main sound input unit, and a communication unit 111 and a connection unit 112 either of which operates as a second sound input unit.

A control unit 101 includes hardware, such as processor, that executes programs stored in a memory 103. The control unit 101 controls the image capturing apparatus 100 by executing the programs stored in the memory 103.

An image capturing unit 102 includes, for example, a lens unit, an image capturing element that converts an optical image of an object formed on an imaging plane through the lens unit into an electric signal, and an image processing unit that generates still image data or moving image data from the electric signal generated by the image capturing element. As the image capturing element, a complementary metal oxide semiconductor (CMOS) sensor or a charge coupled device (CCD) sensor is generally used. In the present exemplary embodiment and the other exemplary embodiments, a series of processing in which the image capturing unit 102 generates still image data or moving image data and outputs the generated data is referred to as "image capturing". The still image data or the moving image data generated by the image capturing unit 102 is recorded in a recording medium 110 according to a Design rule for Camera File system (DCF) standard.

The memory 103 is a nonvolatile memory for storing the programs to be executed by the control unit 101, etc. The memory 103 stores electronic sound data. The electronic sound data stored in the memory 103 includes a focusing sound which is output when an object is in focus, an electronic shutter sound which is output when still image capturing or moving image capturing is instructed, and electronic sound data for an operation sound which is output when the image capturing apparatus 100 is operated.

A memory 104 is a buffer memory for temporarily storing the still image data or the moving image data generated by the image capturing unit 102. The memory 104 also severs as a memory for temporarily storing an image to be displayed on a display unit 106, and as a memory to be used as a working area of the control unit 101 and the like. The memory 104 is also used as a buffer memory for temporarily recording sound data generated by the microphone 107 and sound data generated by the communication unit 111 or the connection unit 112.

An operation unit 105 is a user interface to receive an instruction to the image capturing apparatus 100 from the user. The operation unit 105 includes a power switch to turn on or off the image capturing apparatus 100, and a release switch to instruct still image capturing or moving image capturing. The operation unit 105 further includes a playback button to instruct playback of still image data or moving image data, and a selection button to select an operation mode of the image capturing apparatus 100. Examples of the operation mode of the image capturing apparatus 100 include a still image capturing mode and a moving image capturing mode.

A touch panel provided in the display unit 106 can also be included in the operation unit 105.

The operation unit 105 further includes an operation member, such as a button, for adjusting a volume, etc. of a sound output from a speaker 108. The control unit 101 performs processing for adjusting the volume, etc. of the sound output from the speaker 108 by receiving a user operation via the operation member. The operation unit 105 further includes an operation member, such as a button, for adjusting a volume, etc. of a sound output from a speaker of an external apparatus connected via the communication unit 111 or the connection unit 112. The control unit 101 performs processing for adjusting the volume, etc. of the sound output from the speaker of the external apparatus by receiving a user operation via the operation member. The operation unit 105 further includes an operation member, such as a button, for turning on or off a wireless communication function of the communication unit 111.

The display unit 106 displays still image data or the moving image data generated by the image capturing unit 102, texts for an interactive operation, and the like. The control unit 101 can cause the display unit 106 to function as an electronic view finder by successively displaying image data output from the image capturing unit 102 on the display unit 106, whereby the image capturing apparatus 100 can provide a live-view (LV) function to the user. In the following, an image displayed on the display unit 106 in live-view is referred to as an LV image. The display unit 106 may be not incorporated in the image capturing apparatus 100. Alternatively, the display unit 106 may be externally connected to the image capturing apparatus 100. In any cases, the image capturing apparatus 100 at least has a display control function for controlling display of the display unit 106.

The microphone 107 is a microphone device that collects sound waves of a voice, etc., and generates sound data. In a case where the image capturing apparatus 100 operates in the moving image capturing mode, the control unit 101 can generate moving image data with sounds from moving image data generated by the image capturing unit 102 and sound data generated by the microphone 107 or a microphone of an external apparatus. The moving image data with sounds generated by the control unit 101 is recorded in the recording medium 110 by the control unit 101. In a case where the image capturing apparatus 100 operates in the still image capturing mode, the control unit 101 records the still image data generated by the image capturing unit 102 in the recording medium 110. In the case where the image capturing apparatus 100 operates in the still image capturing mode, the control unit 101 can record still image data generated by the image capturing unit 102 and sound data generated by the microphone 107 in the recording medium 110 in association with each other. In the present exemplary embodiment, the microphone 107 is a microphone included in the image capturing apparatus 100. The processing by the microphone 107 to generate sound data from sound waves may be partially shared with the other hardware, such as the control unit 101.

The speaker 108 is an electroacoustic transducer that can output electronic sound data. Examples of the electronic sound data include a music, an alarm sound, a focusing sound, an electronic shutter sound, and an operation sound. The electronic sound data is stored in the memory 103. The speaker 108 can output electronic sound data selected by the control unit 101. The user can be notified that an object is in focus, an error occurs on the image capturing apparatus 100, or the like, by the sound output from the speaker 108.

A power supply unit 109 can supply power to each of the elements of the image capturing apparatus 100 under the control of the control unit 101. The power supply unit 109 includes a lithium ion buttery or an alkaline manganese dry cell, for example.

The recording medium 110 can record, for example, still image data or moving image data output from the image capturing unit 102, with sound data. Examples of the recording medium 110 include a memory card (secure digital (SD) card, compact flash (CF) card, etc.) and an auxiliary recording device (hard disk drive, solid state drive, etc.). The recording medium 110 may be detachable from the image capturing apparatus 100 or may be incorporated in the image capturing apparatus 100. In other words, an image capturing apparatus including at least a unit for accessing the recording medium 110 is sufficient for the image capturing apparatus 100.

The communication unit 111 is an interface for wireless connection with the external apparatus. The control unit 101 can transmit and receive data to/from the external apparatus via the communication unit 111. For example, the control unit 101 can transmit still image data, moving image data, and sound data recorded in the recording medium 110, to the external apparatus via the communication unit 111. Further, for example, the control unit 101 can receive sound data generated by the microphone of the external apparatus, via the communication unit 111. The sound data generated by the microphone of the external apparatus is input from the external apparatus to the control unit 101 via the communication unit 111. The external apparatus that is connected to the communication unit 111 or the connection unit 112 is an apparatus including a microphone. Examples of the external apparatus include an information processing apparatus (smartphone, personal computer (PC), etc.), an external microphone device, and an apparatus including a speaker and a microphone (earphone microphone, headset, etc.). In the present exemplary embodiment, the communication unit 111 includes an interface for communication with the external apparatus according to the Bluetooth® standard. In the following, communication complying with the Bluetooth® standard is referred to as Bluetooth® communication. The control unit 101 controls the communication unit 111 to perform wireless communication with the external apparatus. A wireless communication method that is used by the communication unit 111 is not limited to the wireless communication method complying with the Bluetooth® standard, and may be a wireless communication method complying with, for example, the Institute of Electrical and Electronics Engineers (IEEE) 802.11 standard (e.g., wireless local area network (LAN)).

The Bluetooth® communication is described. A connection form between communication apparatuses in the Bluetooth® communication is a master-slave star network. In the following, a communication apparatus operating as a master is referred to as a master apparatus, and a communication apparatus operating as a slave is referred to as a slave apparatus. For example, the master apparatus manages participation of the slave apparatus to the network, and sets various kinds of parameters in the wireless connection with the slave apparatus. The master apparatus can be simultaneously connected to a plurality of slave apparatuses. In contrast, the slave apparatus is connected to one master apparatus. In the present exemplary embodiment, for example, the image capturing apparatus 100 serves as the master apparatus, and the external apparatus connected to the image capturing apparatus 100 serves as the slave apparatus.

In the Bluetooth® communication, it is necessary to perform pairing between the master apparatus and the slave apparatus before wireless communication is performed. The paring is processing in which the master apparatus and the slave apparatus mutually record identification information on a partner apparatus (in a predetermined area). In the present exemplary embodiment, in a case where the image capturing apparatus 100 is paired with the external apparatus, the identification information on the external apparatus paired with the image capturing apparatus 100 is recorded in the memory 103. In the present exemplary embodiment, for example, in a case where the image capturing apparatus 100 is paired with a headphone, after the image capturing apparatus 100 records identification information on the headphone and the wireless connection between the headphone and the image capturing apparatus 100 is then established, the image capturing apparatus 100 determines completion of the pairing.

In the present exemplary embodiment, in a case where the image capturing apparatus 100 and the external apparatus are wirelessly connected with each other by Bluetooth®, the user sets the external apparatus into a state where the external apparatus can be detected by the image capturing apparatus 100, and then operates the image capturing apparatus 100 to detect the external apparatus. After the image capturing apparatus 100 detects the external apparatus, the user operates the image capturing apparatus 100 and the external apparatus to wirelessly connect the image capturing apparatus 100 and the external apparatus with each other. The image capturing apparatus 100 can establish the wireless connection with the external apparatus by such a procedure.

The connection unit 112 is an interface for wired connection with the external apparatus. The control unit 101 can transmit and receive data to/from the external apparatus via the connection unit 112. For example, the control unit 101 can transmit still image data, moving image data, and sound data recorded in the recording medium 110, to the external apparatus via the connection unit 112. Further, for example, the control unit 101 can receive sound data generated by the microphone of the external apparatus, via the connection unit 112. The sound data generated by the microphone of the external apparatus is input from the external apparatus to the control unit 101 via the connection unit 112. The connection unit 112 includes, for example, a phone connector (e.g., microphone terminal or a headphone terminal), a universal serial bus (USB) terminal, or an accessary shoe (hot shoe). The image capturing apparatus 100 can be connected by a cable to an external microphone device, an apparatus including a speaker and a microphone (earphone microphone, headset, etc.), or an information processing apparatus (smartphone, PC, etc.) via the connection unit 112. The connection unit 112 includes a detection unit for detecting whether the external apparatus has been connected. Using the detection unit, the control unit 101 can detects that the external apparatus and the image capturing apparatus 100 are connected with or disconnected from each other, the external apparatus and the image capturing apparatus 100 are under connection, the external apparatus and the image capturing apparatus 100 are not connected, and the like.

After the external apparatus and the image capturing apparatus 100 establish connection, the control unit 101 can detect a type (device type) of the external apparatus. For example, in the Bluetooth® communication, the control unit 101 can detect whether the external apparatus includes a headphone, a microphone, or a headset, by using a service discovery protocol (SDP). Further, for example, in a case where wireless LAN is used for communication via the communication unit 111, the control unit 101 can detect the type (device type) of the external apparatus by receiving the type (device type) of the external apparatus from the external apparatus.

For example, in a case where the connection unit 112 is a USB terminal in a wired communication via the connection unit 112, the control unit 101 receives a device descriptor from the external apparatus connected by a cable. The control unit 101 can detect whether the external apparatus includes a microphone and can determine whether the external apparatus includes a speaker, by referring to the device descriptor.

In a case where the connection unit 112 is a phone connector, the control unit 101 can determine whether the external apparatus includes, for example, a speaker, a microphone, or a headset, by receiving identification information from the external apparatus connected by a cable.

Figure 2A:
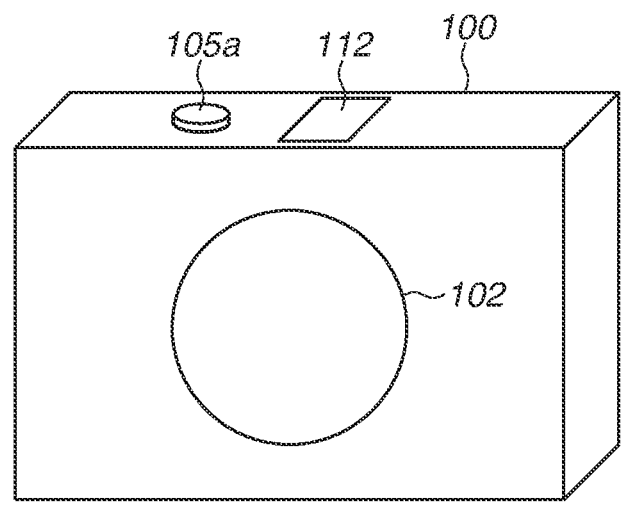
FIG. 2A is a diagram illustrating an example of a front appearance of the image capturing apparatus according to the first exemplary embodiment.
Figure 2B:
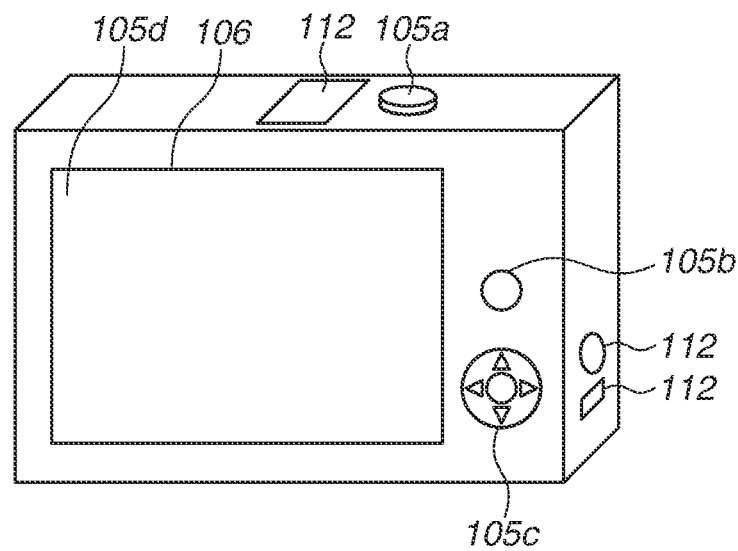
FIG. 2B is a diagram illustrating an example of a rear appearance of the image capturing apparatus according to the first exemplary embodiment.

Next, an example of an appearance of the image capturing apparatus 100 is described. FIG. 2A is a diagram illustrating an example of a front appearance of the image capturing apparatus 100. FIG. 2B is a diagram illustrating an example of a rear appearance of the image capturing apparatus 100. A release switch 105a, a playback button 105b, a direction key 105c, and a touch panel 105d are operation members included in the operation unit 105. The release switch 105a, the playback button 105b, the direction key 105c, and the touch panel 105d are operation members for inputting various kinds of operation instructions to the control unit 101. A still image or a moving image captured by the image capturing unit 102 is displayed on the display unit 106. Examples of the connection unit 112 include an accessary shoe, a phone connector, and a USB terminal.

<Voice Control Function>

The image capturing apparatus 100 has a voice control function. The voice control function is a function in which the control unit 101 performs processing corresponding to a voice instruction of the user collected by the microphone 107. For example, in a case where the voice control function is enabled and the control unit 101 detects that a voice instruction "capture still image" is included in sound data generated by the microphone 107, the control unit 101 controls the image capturing unit 102 to capture a still image. For example, in a case where the control unit 101 detects that a voice instruction "increase volume" is included in sound data generated by the microphone 107, the control unit 101 performs control to increase the volume of the sound output from the speaker 108. The sound data that is used for the voice control function may be input to the control unit 101 from the external apparatus including a microphone. As described above, in the voice control function, the image capturing apparatus 100 can control change of various kinds of settings and execution of various kinds of processing.

In the present exemplary embodiment, in a case where the voice control function is enabled, the control unit 101 recognizes a predetermined voice (hereinafter, referred to as wake word) including in the sound data, and then recognizes a voice instruction following the wake word. In the present exemplary embodiment, the control unit 101 includes a program to recognize contents of a voice instruction (hereinafter, referred to as voice recognition program), and controls various components of the image capturing apparatus 100 based on the voice instruction recognized by the voice recognition program. The control unit 101 converts the voice instruction recognized by the voice recognition program into, for example, a command to control the image capturing apparatus 100, and executes the command. The voice recognition program is stored in the memory 103. To recognize the voice instruction, the control unit 101 may transmit sound data to an external server connected via the Internet, and recognize contents of the voice instruction by using the external server.

The image capturing apparatus 100 may enable the voice control function in response to reception of predetermined user operation. For example, in a case where the operation unit 105 includes a physical button for receiving an operation for enabling the voice control function, the image capturing apparatus 100 may enable the voice control function while the user depresses the button. Alternatively, the image capturing apparatus 100 may display an item for enabling the voice control function on the display unit 106, and enable the voice control function in response to reception of a user operation on the item via the touch panel.

Yet alternatively, in a case where the control unit 101 receives an instruction to start the voice control function from the external apparatus, the control unit 101 may enable the voice control function. In a case where the voice control function is enabled in response to reception of the user operation, the image capturing apparatus 100 may recognize only a voice instruction without recognizing the wake word.

Examples of voice instructions relating to recording of moving image data with sounds include the following contents.

Examples of Voice Instruction
Start image capturing and end image capturing
Change image capturing parameters
End image capturing after a predetermined time (e.g., after one minute) or at a specific time point
Generate data (voice memo, tag, attribute information, etc.) to be added to moving image data with sounds
Display remaining image capturing available time
Display remaining capacity of the recording medium 110
Search for image of captured body (object)
Display translation result of captured characters
Transmit captured still image data or moving image data to a predetermined destination (e.g., cloud storage or own mail address)

<Operation of Image Capturing Apparatus 100>

Next, an example of processing for setting each of the microphone 107 and the microphone of the external apparatus as any of a microphone to be used for the voice control function and a microphone to be used for generation of moving image data with sounds, is described with reference to FIG. 3. The processing is realized in such a manner that the control unit 101 executes programs stored in the memory 103.

In step S301, the control unit 101 determines whether an external apparatus including a microphone and the image capturing apparatus 100 are connected with each other. In a case where the control unit 101 determines that the external apparatus including a microphone and the image capturing apparatus 100 are not connected with each other (NO in step S301), the processing proceeds to step S302. In a case where the control unit 101 determines that the external apparatus including a microphone and the image capturing apparatus 100 are connected with each other (YES in step S301), the processing proceeds to step S303.

In step S302, the control unit 101 sets the microphone 107 as the microphone to be used for generation of moving image data with sounds. Thus, the control unit 101 can generate moving image data with sounds from moving image data generated by the image capturing unit 102 and sound data generated by the microphone 107. The moving image data with sounds generated by the control unit 101 is recorded in the recording medium 110. In other words, the user can use the microphone 107 for generation of moving image data with sounds. In this case, the control unit 101 does not set the microphone 107 as the microphone to be used for the voice control function. Such control can cause the user not to issue the voice instruction to the microphone 107. Therefore, the control unit 101 can achieve a state where a sound corresponding to the voice instruction by the user is less likely recorded with moving image data in the recording medium 110.

In step S303, the control unit 101 determines whether a connection method with the external apparatus is a wireless connection method or a wired connection method. For example, the control unit 101 determines whether the external apparatus and the image capturing apparatus 100 are connected with each other via the communication unit 111 or the connection unit 112. In a case where the external apparatus and the image capturing apparatus 100 are connected with each other via the communication unit 111, the control unit 101 determines that the connection method between the external apparatus and the image capturing apparatus 100 is the wireless connection method. In a case where the control unit 101 determines that the connection method between the external apparatus and the image capturing apparatus 100 is the wireless connection method (WIRELESS CONNECTION in step S303), the processing proceeds to step S304. In a case where the external apparatus and the image capturing apparatus 100 are connected with each other via the connection unit 112, the control unit 101 determines that the connection method between the external apparatus and the image capturing apparatus 100 is the wired connection method. In a case where the control unit 101 determines that the connection method between the external apparatus and the image capturing apparatus 100 is the wired connection method (WIRED CONNECTION in step S303), the processing proceeds to step S306.

First, a case where it is determined in step S303 that the connection method between the image capturing apparatus 100 and the external apparatus is the wireless connection method is described.

In step S304, the control unit 101 sets the microphone of the external apparatus as the microphone to be used for the voice control function. Thus, the control unit 101 can detect whether a sound corresponding to the voice instruction by the user is included in the sound data generated by the microphone of the external apparatus.

In step S305, the control unit 101 sets the microphone 107 as the microphone to be used for generation of moving image data with sounds. Thus, in a case where the image capturing apparatus 100 is in a moving image capturing operation, the control unit 101 can generate moving image data with sounds from the moving image data generated by the image capturing unit 102 and the sound data generated by the microphone 107. The generated moving image data with sounds is recorded in the recording medium 110.

As described above, in the case where the connection method between the image capturing apparatus 100 and the external apparatus is the wireless connection method, the user can use the microphone of the external apparatus for the voice control function, and use the microphone 107 for generation of moving image data with sounds. The reason why the image capturing apparatus 100 properly uses the two microphones in the above-described manner is described.

The reason why the microphone of the external apparatus is to be used for the voice control function is because the external apparatus is likely set in proximity to the user. As a use case example, the user attaches a wirelessly-connected external apparatus to the user himself/herself to use the image capturing apparatus 100 without approaching the microphone 107 so that a sound corresponding to the voice instruction is not recorded in moving image data with sounds. In view of such use case, in the present exemplary embodiment, in a case where the connection method with the external apparatus is the wireless connection method, the control unit 101 sets the microphone of the external apparatus as the microphone to be used for the voice control function by the image capturing apparatus 100.

As described above, in a case where the image capturing apparatus 100 is in a moving image capturing operation and the microphone of the external apparatus is used for the voice control function, the control unit 101 can detect whether a sound corresponding to the voice instruction by the user is included in sound data generated by the microphone of the external apparatus.

In a case where a sound corresponding to the voice instruction is detected from the sound data generated by the microphone of the external apparatus, the control unit 101 can perform processing corresponding to the voice instruction.

However, in a case where a sound corresponding to the voice instruction is included in sound data generated by the microphone 107, the control unit 101 does not receive the voice instruction if a sound corresponding to the voice instruction is not detected from the sound data generated by the microphone of the external apparatus. This enables the user to input the voice instruction to the microphone of the external apparatus even while the image capturing apparatus 100 captures a moving image, whereby the image capturing apparatus 100 can realize a state where a sound corresponding to the voice instruction is less likely recorded with moving image data in the recording medium 110.

Next, a case where the control unit 101 determines in step S303 that the connection method between the image capturing apparatus 100 and the external apparatus is the wired connection system is described.

In step S306, the control unit 101 sets the microphone 107 as the microphone to be used for the voice control function. Thus, the control unit 101 can detect whether a sound corresponding to the voice instruction by the user is included in sound data generated by the microphone 107.

In step S307, the control unit 101 sets the microphone of the external apparatus as the microphone to be used for generation of moving image data with sounds. Thus, in a case where the image capturing apparatus 100 is in a moving image capturing operation, the control unit 101 can generate moving image data with sounds from moving image data generated by the image capturing unit 102 and sound data generated by the microphone of the external apparatus. The generated moving image data with sounds is recorded in the recording medium 110.

As described above, in a case where the connection method between the image capturing apparatus 100 and the external apparatus is the wired connection method, the user can use the microphone 107 for the voice control function, and use the microphone of the external apparatus for generation of moving image data with sounds. The reason why the image capturing apparatus 100 properly uses the two microphones in the above-described manner is described.

The reason why the microphone of the external apparatus is set as the microphone to be used for generation of moving image data with sounds is because the external apparatus may be used to collect voices of an object. The external apparatus connected by a cable to the image capturing apparatus 100 is any of a microphone device (shotgun microphone, etc.) suitable for collection of voices of an object and a microphone device to which an accessary (shock mount, windscreen, etc.) for noise reduction is attached. The user connects such a microphone device to the image capturing apparatus 100 to collect voices of an object with high quality and less noise. Accordingly, in the present exemplary embodiment, in a case where the connection method with the external apparatus is the wired connection method, the control unit 101 sets the microphone of the external apparatus as the microphone to be used for generation of moving image data with sounds.

The reason why the microphone 107 is set as the microphone to be used for the voice control function is to enable the voice control function even during generation of moving image data with sounds. As an example use case, there can be a case where both hands of the user are full because the user holds the image capturing apparatus 100, during generation of a moving image with sounds. In such a case, the user can utilized the voice control function by inputting the voice instruction to the microphone 107 in an undertone so that a sound corresponding to the voice instruction by the user is less likely recorded with moving image data in the recording medium 110. In the present exemplary embodiment, in view of such case, in a case where the connection method with the external apparatus is the wired connection method, the control unit 101 sets the microphone 107 as the microphone to be used for the voice control function by the image capturing apparatus 100.

As described above, in a case where the image capturing apparatus 100 is in the moving image capturing operation and the microphone 107 is set to be used for the voice control function, the control unit 101 can detect whether a sound corresponding to the voice instruction by the user is included in sound data generated by the microphone 107. In the case where a sound corresponding to the voice instruction is detected from the sound data generated by the microphone 107, the control unit 101 can perform processing corresponding to the voice instruction. However, in a case where a sound corresponding to the voice instruction is included in sound data generated by the microphone of the external apparatus, the control unit 101 does not receive the voice instruction if a sound corresponding to the voice instruction is not detected from sound data generated by the microphone 107. This enables the user to input the voice instruction to the microphone 107 even while the image capturing apparatus 100 captures a moving image, and the user can control the image capturing apparatus 100 by the voice instruction. In this case, the control unit 101 can record voices of an object with high quality and less noise by using the microphone of the external apparatus for generation of moving image data with sounds.

In a case where the external apparatus and the image capturing apparatus 100 are wirelessly connected with each other, the image capturing apparatus 100 may perform the following sound processing. For example, the image capturing apparatus 100 may perform processing on the sound data generated by the microphone 107 to set a sound corresponding to the voice instruction by the user to be less obvious, by using sound data generated by the microphone of the external apparatus and sound data generated by the microphone 107. In a case where the external apparatus and the image capturing apparatus 100 are connected with each other by a cable, the image capturing apparatus 100 may perform the following sound processing. For example, the image capturing apparatus 100 may perform processing on a sound data generated by the microphone of the external apparatus to set a sound corresponding to the voice instruction by the user to be less obvious, by using sound data generated by the microphone 107 and sound data generated by the microphone of the external apparatus.

As described above, according to the present exemplary embodiment, in a case where the external apparatus and the image capturing apparatus 100 are connected with each other, the image capturing apparatus 100 can use the microphone 107 and the microphone of the external apparatus for different applications, whereby usability can be improved. More specifically, even in a case where the user controls the image capturing apparatus 100 by the voice control function while the image capturing apparatus 100 captures a moving image, the image capturing apparatus 100 can achieve a state where a sound corresponding to the voice instruction by the user is less likely recorded with moving image data in the recording medium 110.

A second exemplary embodiment is described below. In recent years, along with popularization of a smartphone, an apparatus (headset, earphone microphone, etc.) including a microphone and a speaker becomes widespread. Such an apparatus is designed in such a manner that the speaker is set in close to ears of the user and the microphone is set in close to a mouth of the user. If the image capturing apparatus 100 receives a voice instruction input to the microphone of such an apparatus, the image capturing apparatus 100 can reduce possibility that the voice instruction by the user is recorded with moving image data in the recording medium 110. Thus, in the present exemplary embodiment, a description is provided of a method which enables selection whether to use each of the microphone 107 and the microphone of the external apparatus for the voice control function or for generation of moving image data with sounds, based on whether the external apparatus including the microphone includes a speaker.

FIG. 1 is a block diagram illustrating a configuration example of the image capturing apparatus 100 according to the present exemplary embodiment. The configuration example of the image capturing apparatus 100 according to the present exemplary embodiment is similar to the configuration example of the image capturing apparatus 100 according to the first exemplary embodiment. Thus, a redundant description of the configuration example is omitted.

An example of processing to set each of the microphone 107 and the microphone of the external apparatus as any of the microphone to be used for the voice control function and the microphone to be used for generation of moving image data with sounds is described with reference to FIG. 4. The processing is realized in such a manner that the control unit 101 executes programs stored in the memory 103.

In step S401, the control unit 101 determines whether the external apparatus including the microphone and the image capturing apparatus 100 are connected with each other. In a case where the control unit 101 determines that the external apparatus including the microphone and the image capturing apparatus 100 are not connected with each other (NO in step S401), the processing proceeds to step S402. In a case where the control unit 101 determines that the external apparatus including the microphone and the image capturing apparatus 100 are connected with each other (YES in step S401), the processing proceeds to step S403.

In step S402, the control unit 101 sets the microphone 107 as the microphone to be used for generation of moving image data with sounds. Thus, in a case where the image capturing apparatus 100 is in a moving image capturing operation, the control unit 101 can generate moving image data with sounds from moving image data generated by the image capturing unit 102 and sound data generated by the microphone 107. The moving image data with sounds generated by the control unit 101 is recorded in the recording medium 110. In other words, the user can use the microphone 107 for generation of moving image data with sounds. In this case, the control unit 101 does not set the microphone 107 as the microphone for the voice control function. Such control can cause the user not to issue the voice instruction to the microphone 107. Therefore, the control unit 101 can achieve a state where a sound corresponding to the voice instruction by the user is less likely recorded with moving image data in the recording medium 110.

In step S403, the control unit 101 determines whether the external apparatus includes a speaker. For example, a type of the external apparatus detected after connection between the external apparatus and the image capturing apparatus 100 is established is a headset or an earphone microphone, the control unit 101 determines that the external apparatus includes a speaker. For example, in a case where the type of the external apparatus detected after connection between the external apparatus and the image capturing apparatus 100 is established is a microphone device, the control unit 101 determines that the external apparatus does not include a speaker. In a case where the control unit 101 determines that the external apparatus includes a speaker (YES in step S403), the processing proceeds to step S404. In a case where the control unit 101 determines that the external apparatus does not include a speaker (NO in step S403), the processing proceeds to step S406. In the present exemplary embodiment, unlike the first exemplary embodiment, the control unit 101 does not determine whether the connection method with the external apparatus is the wired connection method or the wireless connection method.

First, a case where the control unit 101 determines in step S403 that the external apparatus includes a speaker is described.

In step S404, the control unit 101 sets the microphone of the external apparatus as the microphone to be used for the voice control function. Thus, the control unit 101 can detect whether a sound corresponding to the voice instruction by the user is included in sound data generated by the microphone of the external apparatus.

In step S405, the control unit 101 sets the microphone 107 as the microphone to be used for generation of moving image data with sounds. Thus, in a case where the image capturing apparatus 100 is in a moving image capturing operation, the control unit 101 can generate moving image data with sounds from moving image data generated by the image capturing unit 102 and sound data generated by the microphone 107. The generated moving image data with sounds is recorded in the recording medium 110.

Accordingly, in a case where the external apparatus including the microphone includes a speaker, the user can use the microphone of the external apparatus for the voice control function, and use the microphone 107 for generation of moving image data with sounds.

As described above, in a case where the image capturing apparatus 100 is in a moving image capturing operation and the microphone of the external apparatus is to be used for the voice control function, the control unit 101 can detect whether a sound corresponding to the voice instruction by the user is included in sound data generated by the microphone of the external apparatus.

Further, in a case where a sound corresponding to the voice instruction is detected from the sound data generated by the microphone of the external apparatus, the control unit 101 can perform processing corresponding to the voice instruction.

However, in a case where a sound corresponding to the voice instruction is included in sound data generated by the microphone 107, the control unit 101 does not receive the voice instruction if a sound corresponding to the voice instruction is not detected from sound data generated by the microphone of the external apparatus. Accordingly, the user can control the image capturing apparatus 100 by inputting the voice instruction to the microphone of the external apparatus.

Next, a case where the control unit 101 determines in step S403 that the external apparatus does not include a speaker is described.

In step S406, the control unit 101 sets the microphone 107 as the microphone to be used for the voice control function. Thus, the control unit 101 can detect whether a sound corresponding to the voice instruction by the user is included in sound data generated by the microphone 107.

In step S407, the control unit 101 sets the microphone of the external apparatus as the microphone to be used for generation of moving image data with sounds. Thus, in a case where the image capturing apparatus 100 is in a moving image capturing operation, the control unit 101 can generate moving image data with sounds from moving image data generated by the image capturing unit 102 and sound data generated by the microphone of the external apparatus. The generated moving image data with sounds is recorded in the recording medium 110.

Thus, in a case where the external apparatus including the microphone does not include a speaker, the user can use the microphone 107 for the voice control function, and use the microphone of the external apparatus for generation of moving image data with sounds.

The reason why the microphone of the external apparatus is used for generation of moving image data with sounds in a case where the external apparatus including the microphone does not include a speaker is because such an external apparatus connected to the image capturing apparatus may be used for collection of voices of an object. In other words, such an external apparatus is any of a microphone device (shotgun microphone, etc.) suitable for collection of voices of an object and a microphone to which an accessary (shock mount, windscreen, etc.) for noise reduction is attached. The user connects such a microphone device to the image capturing apparatus 100 to collect voices of an object with high quality and less noise. Accordingly, in the present exemplary embodiment, in the case where the external apparatus including the microphone does not include a speaker, the control unit 101 sets the microphone of the external apparatus as the microphone to be used for generation of moving image data with sounds.

As described above, in a case where the image capturing apparatus 100 is in a moving image operation and the microphone 107 is used for the voice control function, the control unit 101 can detect whether a sound corresponding to the voice instruction by the user is included in sound data generated by the microphone 107. In a case where a sound corresponding to the voice instruction is detected from the sound data generated by the microphone 107, the control unit 101 can perform processing corresponding to the voice instruction. However, in a case where a sound corresponding to the voice instruction is included in sound data generated by the microphone of the external apparatus, the control unit 101 does not receive the voice instruction if a sound corresponding to the voice instruction is not detected from the sound data generated by the microphone 107. Accordingly, the user can control the image capturing apparatus 100 by inputting the voice instruction to the microphone 107.

In the present exemplary embodiment, in a case where a sound corresponding to the voice instruction is detected from sound data generated by the microphone of the external apparatus, the control unit 101 controls the external apparatus such that predetermined sound data is transmitted to the external apparatus and is output from the speaker of the external apparatus. The predetermined sound data is, for example, sound data to notify the user that the image capturing apparatus 100 has received the voice instruction by the user. Accordingly, the user can know that the image capturing apparatus 100 has received the voice instruction by the user, from sound waves output from the speaker of the external apparatus.

In the present exemplary embodiment, in both of the case where the external apparatus including the microphone include a speaker and the case where the external apparatus is connected to the image capturing apparatus 100 wirelessly or by a cable, the image capturing apparatus 100 uses the microphone of the external apparatus for the voice control function.

In the present exemplary embodiment, a use case where the voice control function is used when the image capturing apparatus 100 operates in the moving image capturing mode is described. However, the use case using the voice control function is not limited thereto. For example, the image capturing apparatus 100 may use the voice control function also in a case where the operation mode of the image capturing apparatus 100 is an operation mode for recording sound data in the recording medium 110. As described above, in a case where the voice instruction for the voice control function affects operability, convenience, etc. of other functions, operation of the image capturing apparatus 100 according to the present exemplary embodiment is particularly effective.

In a case where the external apparatus like an earphone microphone is connected to the image capturing apparatus 100, the image capturing apparatus 100 may perform the following sound processing. For example, the image capturing apparatus 100 may perform processing on sound data generated by the microphone 107 to set a sound corresponding to the voice instruction by the user to be less obvious, by using sound data generated by the microphone of the external apparatus and sound data generated by the microphone 107. In a case where the external apparatus like a shotgun microphone is connected to the image capturing apparatus 100, the image capturing apparatus 100 may perform the following sound processing. For example, the image capturing apparatus 100 may perform processing on sound data generated by the microphone of the external apparatus to set a sound corresponding to the voice instruction by the user to be less obvious, by using sound data generated by the microphone 107 and sound data generated by the microphone of the external apparatus.

As described above, according to the present exemplary embodiment, in a case where the external apparatus including the microphone further includes a speaker, the image capturing apparatus 100 can use the microphone of the external apparatus for the voice control function, whereby usability can be improved. More specifically, even in a case where the user controls the image capturing apparatus 100 by the voice control function while the image capturing apparatus 100 captures a moving image, the image capturing apparatus 100 can achieve a state where a sound corresponding to the voice instruction by the user is less likely recorded with moving image data in the recording medium 110.

A third exemplary embodiment is described below. In the present exemplary embodiment, a method to enable selection whether to use each of the microphone 107 and the microphone of the external device for the voice control function or for generation of moving image data with sounds, based on a user setting stored in the memory 103, is described. The user can change the user setting stored in the memory 103 by operating the operation unit 105.

FIG. 1 is a block diagram illustrating a configuration example of the image capturing apparatus 100 according to the present exemplary embodiment. The configuration example of the image capturing apparatus 100 according to the present exemplary embodiment is similar to the configuration example of the image capturing apparatus 100 according to the first exemplary embodiment. Therefore, a redundant description of the configuration example is omitted.

In the present exemplary embodiment, in a case where the external apparatus and the image capturing apparatus 100 are connected with each other, the control unit 101 can select whether to acquire sound data to be recorded with moving image data from the microphone 107 or the external apparatus. More specifically, the control unit 101 can select whether to acquire the sound data to be recorded with the moving image data from the microphone 107 or the external apparatus, based on user operation received by the operation unit 105.

An example of processing to set each of the microphone 107 and the microphone of the external apparatus as any of the microphone to be used for the voice control function and the microphone to be used for generation of moving image data with sounds is described with reference to FIG. 5. The processing is realized in such a manner that the control unit 101 executes programs stored in the memory 103.

In step S501, the control unit 101 determines whether the external apparatus including the microphone and the image capturing apparatus 100 are connected with each other. In a case where the control unit 101 determines that the external apparatus including the microphone and the image capturing apparatus 100 are not connected with each other (NO in step S501), the processing proceeds to step S502. In a case where the control unit 101 determines that the external apparatus and the image capturing apparatus 100 are connected with each other (YES in step S501), the processing proceeds to step S503.

In step S502, the control unit 101 sets the microphone 107 as the microphone to be used for generation of moving image data with sounds. Thus, in a case where the image capturing apparatus 100 is in a moving image capturing operation, the control unit 101 can generate moving image data with sounds from moving image data generated by the image capturing unit 102 and sound data generated by the microphone 107. The moving image data with sounds generated by the control unit 101 is recorded in the recording medium 110. In other words, the user can use the microphone 107 for generation of moving image data with sounds. In this case, the control unit 101 does not set the microphone 107 as the microphone to be used for the voice control function. Such control can cause the user not to issue the voice instruction to the microphone 107. Therefore, the control unit 101 can achieve a state where a sound corresponding to the voice instruction by the user is less likely recorded with moving image data in the recording medium 110.

In step S503, the control unit 101 determines whether to use the microphone of the external apparatus or the microphone 107 for the voice control function, based on a user setting stored in the memory 103. The user setting is, for example, a setting for determining the microphone of the external apparatus or the microphone 107 as the microphone to be used for the voice control function. In the present exemplary embodiment, the user previously stores the setting in the memory 103 before start of moving image capturing. In a case where the control unit 101 determines that the microphone of the external apparatus is used for the voice control function (MICROPHONE OF EXTERNAL APPARATUS in step S503), the processing proceeds to step S504. In a case where the control unit 101 determines that the microphone 107 is used for the voice control function (MICROPHONE 107 in step S503), the processing proceeds to step S506.

In the present exemplary embodiment, unlike the first exemplary embodiment, the control unit 101 does not determine whether the connection method with the external apparatus is the wired connection method or the wireless connection method.

First, a case where the control unit 101 determines in step S503 that the microphone of the external apparatus is used for the voice control function is described.

In step S504, the control unit 101 sets the microphone of the external apparatus as the microphone to be used for the voice control function. Thus, the control unit 101 can detect whether a sound corresponding to the voice instruction by the user is included in sound data generated by the microphone of the external apparatus.

In step S505, the control unit 101 sets the microphone 107 as the microphone to be used for generation of moving image data with sounds. Thus, in a case where the image capturing apparatus 100 is in a moving image capturing operation, the control unit 101 can generate moving image data with sounds from moving image data generated by the image capturing unit 102 and sound data generated by the microphone 107. The generated moving image data with sounds is recorded in the recording medium 110.

Accordingly, the user can use the microphone of the external apparatus for the voice control function, and use the microphone 107 for generation of moving image data with sounds.

As described above, in a case where the image capturing apparatus 100 is in a moving image capturing operation and the microphone of the external apparatus is used for the voice control function, the control unit 101 can detect whether a sound corresponding to the voice instruction by the user is included in sound data generated by the microphone of the external apparatus.

Further, in a case where a sound corresponding to the voice instruction is detected from the sound data generated by the microphone of the external apparatus, the control unit 101 can perform processing corresponding to the voice instruction.

Accordingly, the user can control the image capturing apparatus 100 by inputting the voice instruction to the microphone of the external apparatus.

Next, a case where the control unit 101 determines in step S503 that the microphone 107 is used for the voice control function is described.

In step S506, the control unit 101 sets the microphone 107 as the microphone to be used for the voice control function. Thus, the control unit 101 can detect whether a sound corresponding to the voice instruction by the user is included in sound data generated by the microphone 107.

In step S507, the control unit 101 sets the microphone of the external apparatus as the microphone to be used for generation of moving image data with sounds. Thus, in a case where the image capturing apparatus 100 is in a moving image capturing operation, the control unit 101 can generate moving image data with sounds from moving image data generated by the image capturing unit 102 and sound data generated by the microphone of the external apparatus. The generated moving image data with sounds is recorded in the recording medium 110.

Accordingly, the user can use the microphone 107 for the voice control function, and use the microphone of the external apparatus for generation of moving image data with sounds.

As described above, in a case where the image capturing apparatus 100 is in a moving image capturing operation and the microphone 107 is used for the voice control function, the control unit 101 can detect whether a sound corresponding to the voice instruction by the user is included in sound data generated by the microphone 107. In a case where a sound corresponding to the voice instruction is detected from the sound data generated by the microphone 107, the control unit 101 can perform processing corresponding to the voice instruction. Accordingly, the user can control the image capturing apparatus 100 by inputting the voice instruction to the microphone 107.

As described above, according to the present exemplary embodiment, the user can select applications of the microphone 107 and the microphone of the external apparatus, whereby usability can be improved. More specifically, even in a case where the user controls the image capturing apparatus 100 by the voice control function while the image capturing apparatus 100 captures a moving image, the image capturing apparatus 100 can realize a state where a sound corresponding to the voice instruction by the user is less likely recorded with moving image data in the recording medium 110.

Other Embodiments

The above-described exemplary embodiments can be realized by causing one or more processors of a system or an apparatus to execute programs supplied to the system or the apparatus through a network or a storage medium. The above-described exemplary embodiments can be realized by using a circuit (e.g., application specific integrated circuit (ASIC)) realizing one or more functions of the above-described exemplary embodiments.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-028812, filed Feb. 25, 2021, which is hereby incorporated by reference herein in its entirety.

What is claimed is:

1. An image capturing apparatus, comprising:
one or more processors:
a first sound input unit;
a second sound input unit different from the first sound input unit;
an image capturing unit; and
a control unit,
wherein the control unit generates moving image data with sounds from moving image data generated by the image capturing unit and sound data generated by the first sound input unit,
wherein, in a case where a sound corresponding to a voice instruction to control the image capturing apparatus is detected from sound data input to the second sound input unit, the control unit controls the image capturing apparatus based on the voice instruction,
wherein the second sound input unit includes a wireless communication unit configured to receive sound data from an external apparatus,
wherein, in a case where the sound corresponding to the voice instruction to control the image capturing apparatus is not detected from the sound data input to the second sound input unit, the control unit does not receive the voice instruction even in a case where the sound corresponding to the voice instruction to control the image capturing apparatus is included in the sound data generated by the first sound input unit, and
wherein the control unit is implemented by the one or more processors.

2. The image capturing apparatus according to claim 1, wherein the wireless communication unit communicates with the external apparatus according to the Bluetooth® standard.

3. The image capturing apparatus according to claim 1, wherein the first sound input unit is a microphone included in the image capturing apparatus.

4. The image capturing apparatus according to claim 1, wherein the first sound input unit includes a wired communication unit configured to receive sound data from an external apparatus.

5. The image capturing apparatus according to claim 1, wherein, in a case where the external apparatus includes a speaker, the second sound input unit receives sound data from the external apparatus, and in a case where the external apparatus does not include a speaker, the first sound input unit receives sound data from the external apparatus.

6. The image capturing apparatus according to claim 1, wherein the control unit determines a unit for receiving sound data from the external apparatus from among the first sound input unit and the second sound input unit, based on a user setting.

7. The image capturing apparatus according to claim 1, wherein, in a case where the sound corresponding to the voice instruction to control the image capturing apparatus is detected from sound data input from the external apparatus to the second sound input unit, the control unit controls the external apparatus to output predetermined sound data from a speaker of the external apparatus.

8. A method of controlling an image capturing apparatus including a first sound input unit, a second sound input unit, including a wireless communication unit configured to receive sound data from an external apparatus, different from the first sound input unit, an image capturing unit, and a control unit, the method comprising:
   generating moving image data with sounds from moving image data generated by the image capturing unit and sound data generated by the first sound input unit; and
   controlling, in a case where a sound corresponding to a voice instruction to control the image capturing apparatus is detected from sound data input to the second sound input unit, the image capturing apparatus based on the voice instruction,
   wherein, in a case where the sound corresponding to the voice instruction to control the image capturing apparatus is not detected from the sound data input to the second sound input unit, the control unit does not receive the voice instruction even in a case where the sound corresponding to the voice instruction to control the image capturing apparatus is included in the sound data generated by the first sound input unit.

9. A non-transitory computer-readable recording medium that stores a program for causing an image capturing apparatus to perform a control method, the image capturing apparatus including a first sound input unit, a second sound input unit, including a wireless communication unit configured to receive sound data from an external apparatus, different from the first sound input unit, an image capturing unit, and a control unit, the control method comprising:
   generating moving image data with sounds from moving image data generated by the image capturing unit and sound data generated by the first sound input unit; and
   controlling, in a case where a sound corresponding to a voice instruction to control the image capturing apparatus is detected from sound data input to the second sound input unit, the image capturing apparatus based on the voice instruction,
   wherein, in a case where the sound corresponding to the voice instruction to control the image capturing apparatus is not detected from the sound data input to the second sound input unit, the control unit does not receive the voice instruction even in a case where the sound corresponding to the voice instruction to control the image capturing apparatus is included in the sound data generated by the first sound input unit.

* * * * *